United States Patent [19]

Lieberman

[11] 4,288,325

[45] Sep. 8, 1981

[54] WATER TAP FILTER

[75] Inventor: Samuel Lieberman, Newton Centre, Mass.

[73] Assignee: Thomas P. Shann, Boston, Mass.

[21] Appl. No.: 82,806

[22] Filed: Oct. 9, 1979

[51] Int. Cl.³ .............................................. B01D 25/02
[52] U.S. Cl. .................................... 210/449; 210/456
[58] Field of Search ............... 210/282, 289, 419, 449, 210/456, 450, 451; 239/428.5, 553.3, 553.5, 590.3, 590.5

[56] References Cited

U.S. PATENT DOCUMENTS

| 649,082 | 5/1900 | Stahle | 210/449 |
| 2,328,381 | 8/1943 | Jaffe | 210/449 |
| 2,334,802 | 11/1943 | Zuckermann | 210/449 |
| 2,633,343 | 3/1953 | Aghnides | 210/449 |

Primary Examiner—Ivars C. Cintins
Attorney, Agent, or Firm—Wolf, Greenfield & Sacks

[57] ABSTRACT

A water tap filter having separable components for selective use in forming either a steady stream of water or alternately a spray. The unit includes in its steady stream component a filter element.

1 Claim, 1 Drawing Figure

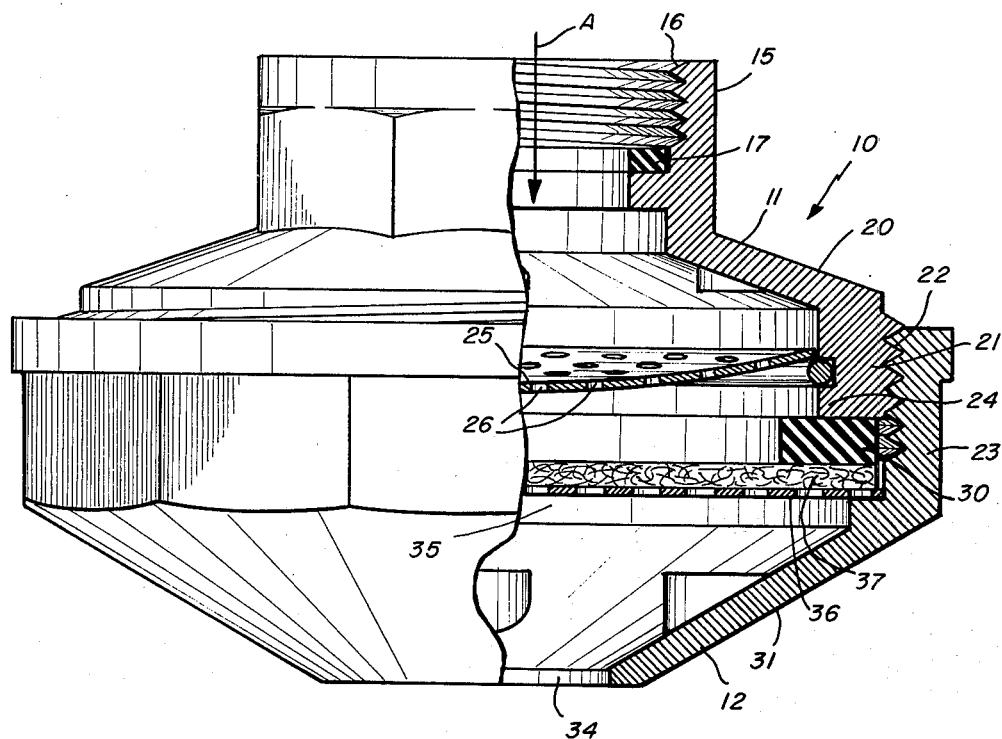

WATER TAP FILTER

BACKGROUND OF INVENTION

This invention relates to an improved filter device which may be used as an attachment to a conventional water tap. While there have been numerous devices proposed and employed to filter water from conventional household water taps, none, insofar as I have been able to determine, provides a unit which may be selectively used to form a steady stream or alternately a spray. Further, I am not aware of units for attachment to water taps which provide filtering and also selective use for spray or steady stream generation of water.

SUMMARY OF THE INVENTION

The filter unit of the present invention includes a housing formed of an upper and lower component. The upper component is provided with a diffusing screen which screen forms water passing through it into a spray. The lower component is provided with a water filter unit and is shaped to re-form the spray into a steady stream.

It is thus an object of the present invention to provide a water filter unit having a pair of components adapted to be selectively engaged or disengaged to provide selectively a spray or alternately a steady stream of water, and with one of the components containing a filter unit. A further object of the present invention is to provide a water tap attachment designed with separable components that provide, in normal assembled use, a steady stream of water and, when separated a spray from a water tap. This invention also provides an assembly of components used to form selectively a steady stream or spray of water with the components readily disassembled for cleaning and repair.

A further object of the present invention is to provide a filter system of simple and inexpensive but sturdy construction.

DESCRIPTION OF DRAWINGS

The foregoing and other objects and advantages of this invention will be understood more fully from the following detailed description of this invention in which the drawing illustrates an elevation of a unit embodying the present invention in partial cross section.

DESCRIPTION OF THE PREFERRED EMBODIMENT

As shown in the drawings, the filter unit includes a housing 10 in turn formed of an upper component 11 and lower component 12. The upper component 11 is formed with an annular collar 15 that is internally threaded at 16 to engage the nozzle of a conventional household water tap. An O-ring 17 is seated within the annular collar 15 to provide a water tight seal when the collar 15 is threaded onto the nozzle of the water tap. A skirt 20 depends angularly outwardly from the lower end of the collar 15 and terminates in a depending annular lip 21 which is externally threaded at 22 to receive complementary threads on a complementary lip 23 formed at the upper end of the lower component 12. The depending annular lip 21 is formed with an internally extending shoulder 24 that engages and secures a screen 25. The screen 25 is formed with a plurality of apertures 26 that diffuse water moving in the direction of arrow A from the nozzle of a water tap to which the housing is secured. The water is spread by the screen 25 into a spray as it passes into the lower component 12.

The upper component 11 is provided with a sealing ring or O-ring 30 below the lip 24 to provide a water tight seal between the upper and lower components 11 and 12. The lower component 12 threads onto the upper component 11 with the lip 21 in threaded engagement with the lip 23. At the lower end of the lip 23 is an inwardly extending skirt 31 that forms a frustoconic section and terminates in an axially located opening 34. The opening 34 is coaxial with the opening formed by the collar 15 and is spaced below the water filter unit generally illustrated at 35.

The water filter unit 35 comprises a metal mesh 36 formed of conventional metal mesh material or alternately may comprise a multiperforated metal disc. This metal screen 36 supports a cotton or other fibrous filter material 37 which is circular in shape and which extends entirely across the lower component 12 at the juncture of the lip 23 and skirt 31. The filter pad 37 is secured rigidly between the screen 36 and ring 30 and preferably has a thickness in the order of several millimeters. This filter material 37 is designed to engage and hold particles in the water passing through the filter. The screen 36 and the screen 26, when the unit is assembled, are spaced apart less than ¼ of an inch with the screen 26 bowed to form a very shallow dome-like depending configuration as illustrated. The screen 36 is substantially planar.

In use, the assembled unit as illustrated may be secured to a conventional nozzle of a water tap. Water passing in the direction of arrow A first passes through the upper component 11. When this water hits screen 25, it diffuses and spreads uniformly across the filter 37. The water at this point is essentially a spray in which the impact of the water is somewhat lessened by the diffusing effect of screen 25. This diffusing effect, in turn, causes less damage to the relatively fragile cotton or other fiber pad 37. After the water passes through screen 36, the lower component 12 redirects the stream of water with the skirt 31 converging this stream into a steady stream that flows out of the opening 34. Thus, the unit as assembled both filters water with a diffusing action and also emits the water in a steady uniform stream.

If the unit is to be used as a spray unit, the lower component is removed together with the filter elements 36 and 37 as well as the O-ring 30. The water passing in the direction of arrow A will pass through the screen 25 in a conventional shower-like spray.

If the user desires to replace the filter 37 the lower component is removed and the filter is simply replaced. Since these filters absorb most particulate matter that is carried by the stream of water, they get dirty quite readily. The life of the filter, however, is maximized, as described above, by the diffusing effect of the screen 25.

It should be understood that the foregoing description of the invention is intended to merely be illustrative thereof and that other embodiments and modifications may be apparent to those skilled in the art without departing from the spirit and within the scope of the appended claims.

What I claim is:

1. A filter device for attachment to a water tap nozzle comprising upper and lower components having means for selective interengagement and detachment, said upper component having means for securing to a water tap nozzle at one end and for attachment to said lower component at the other end thereof, and said upper component providing a passage for water from said tap to said lower component and having a water diffusing screen extending across said passage, said water diffusing screen being bowed to form a very shallow dome-like depending configuration, said lower component forming a passage for water from said upper component and having a single thin porous fibrous water filter pad having a thickness of several millimeters or less extending across the passage in said lower component and aligned with said screen in said upper component to receive water passing therefrom in a spray form, a supporting metal mesh screen positioned below and adjacent to said fibrous filter for support thereof, a sealing ring positioned above and in facing relation with said fibrous filter and forming a sandwich of said sealing ring, fibrous filter and mesh screen with said sandwich rigidly secured between projections extending from the internal walls of said upper and lower components, said diffusing screen spaced a distance of less than ¼ inch above said filter to substantially reduce the impact of the water spray on the porous filter, said lower component forming a chamber as means for receiving water passing through said water filter and redirecting said water from a spray form to a steady stream as it passes from said device.

* * * * *